(12) United States Patent
Scherrer

(10) Patent No.: US 7,537,627 B2
(45) Date of Patent: May 26, 2009

(54) GAS-LIQUID IMPINGEMENT SEPARATORS

(75) Inventor: Paul K. Scherrer, Johnson City, TN (US)

(73) Assignee: Eastman Chemical Company, Kingsport, TN (US)

( * ) Notice: Subject to any disclaimer, the term of this patent is extended or adjusted under 35 U.S.C. 154(b) by 620 days.

(21) Appl. No.: 11/155,756

(22) Filed: Jun. 17, 2005

(65) Prior Publication Data

US 2006/0283159 A1 Dec. 21, 2006

(51) Int. Cl.
*B01D 45/00* (2006.01)
(52) U.S. Cl. .............................. 55/440; 55/423; 55/443
(58) Field of Classification Search .................. 55/443, 55/444, 446, 392, 424, 426, 462, 394, 440, 55/434, 442, 423; 95/267; 96/188, 189, 96/190
See application file for complete search history.

(56) References Cited

U.S. PATENT DOCUMENTS

| | | | |
|---|---|---|---|
| 851,494 A | | 4/1907 | Chalfant |
| 2,624,503 A | * | 1/1953 | Kutcher .................... 417/156 |
| 3,254,475 A | * | 6/1966 | Farr et al. .................. 96/232 |
| 3,656,280 A | | 4/1972 | Perry |
| 4,825,653 A | * | 5/1989 | Silvestri, Jr. ................. 60/646 |
| 5,181,943 A | | 1/1993 | Weber |
| 5,510,017 A | | 4/1996 | Abdullayev |
| 5,882,386 A | | 3/1999 | McAferty et al. |
| 6,083,291 A | * | 7/2000 | Okada et al. ................ 55/337 |
| 6,171,379 B1 | * | 1/2001 | Rolland ..................... 96/189 |

(Continued)

FOREIGN PATENT DOCUMENTS

DE 932 403 9/1955

(Continued)

OTHER PUBLICATIONS

Notification of Transmittal of the International Search Report and the Written Opinion of the International Searching Authority, or the Declaration date of mailing Jan. 2, 2007 on the corresponding PCT application.

(Continued)

*Primary Examiner*—Duane S Smith
*Assistant Examiner*—Sonji Turner
(74) *Attorney, Agent, or Firm*—Brett L Nelson; Bernard J. Graves, Jr.

(57) ABSTRACT

A gas liquid separator adapted to be inserted into a conduit is disclosed. The gas-liquid separator includes downward sloping vanes and optionally, one or more return channels. The vanes may have an opening along the length thereof, and a bottom lip to channel accumulated liquid to the conduit wall or to sloped return channels. If the conduit is not sloped such that the captured droplets are returned to the originating vessel, sloped return channel/channels are used to return the captured droplets to the vessel from which the gas stream originated. With a central return channel, the vanes can be attached directly to the channel with the resulting assembly having a fishbone shape. When a central return channel is not used, the vanes can be attached to a central plate or spine with the resulting spine-vanes assembly again having a fishbone shape. The separation enhancers can be used in a variety of conduit configurations. Furthermore, a plurality of separation enhancers can be utilized in an exhaust gas conduit to increase the removal efficiency.

32 Claims, 8 Drawing Sheets

U.S. PATENT DOCUMENTS

| | | |
|---|---|---|
| 6,454,825 B1 | 9/2002 | Cheimets et al. |
| 7,004,998 B2 * | 2/2006 | Scherrer ..................... 95/267 |
| 2005/0056150 A1 | 3/2005 | Scherrer |

FOREIGN PATENT DOCUMENTS

| | | |
|---|---|---|
| DE | 28 23 942 | 10/1979 |
| DE | 36 40 377 A1 | 6/1988 |
| EP | 0 489 575 A1 | 6/1992 |
| EP | 0 914 855 A1 | 5/1999 |
| GB | 906 644 | 9/1962 |
| GB | 2 259 025 A | 3/1993 |
| WO | WO 86/01739 | 3/1986 |
| WO | WO 03/095069 A1 | 11/2003 |
| WO | WO 2005/051507 A2 | 6/2004 |

OTHER PUBLICATIONS

Copending U.S. Appl. No. 11/437,297, "Novel Gas-Liquid Separator Utilizing Turning Vanes to Capture Liquid Droplets as Well as Redirect the Gas Flow Around a Bend", Inventor Paul K. Scherrer.
International Search Report for WO 05/051507 which corresponds to USP 7,004,998 (previously cited as Pub. No. 2005/0056150).
Abstract of WO 86/01739 in English which corresponds to EP 0 197 060.

* cited by examiner

GAS-LIQUID IMPINGEMENT SEPARATORS

CROSS-REFERENCE TO RELATED APPLICATIONS

This application is related to Patent Application No. 20050056150, filed Sep. 17, 2003

BACKGROUND OF THE INVENTION

1. Field of the Invention

The present invention is directed to separation of liquid droplets from gas-liquid streams in chemical processes.

2. Background Art

Many chemical processes require take-off of a gas phase from chemical processing equipment such as chemical reactors. In some cases, the nature of the various reactants, products, and by-products facilitate removal of a gas phase substantially free of liquid. However, in other processes, considerable quantities of liquid droplets may be associated with the gas phase, and in the case where the liquid droplets can later solidify, whether due strictly to a phase change or to subsequent reaction, lines and valves may be plugged and require disassembly and cleaning or replacement. Furthermore, in many cases, the liquid droplets may constitute a loss of valuable reactants, intermediate products, or end products. For example, during preparation of polyethylene terephthalate polymers, polymer and oligomer particles may carry over with ethylene glycol and water as the latter are removed from the reactor in a vapor phase.

Many types of devices for liquid removal from gas streams are known, including cyclone separators, chill plates, filters, and the like. Packed columns efficiently remove liquid droplets, for example. However, many of these methods, for instance chill plates, are energy intensive, and others such as packed columns exhibit a severe pressure drop as well as being prone to plugging. In-line filters also suffer from these drawbacks.

Inertial separators or traps make use of the fact that a flowing gas can easily make turns that droplets with large inertia cannot. The droplets that cannot turn with the gas stream because of their inertia strike or impact a target or collecting surface, onto which they are deposited. A simple pipe elbow is an example of such a separator. However, such separators are generally efficient only for droplets of materials with large inertia. Since the inertia of the droplets is measured by its mass, the size and density of the droplets is important in determining the removal efficiency.

In U.S. Pat. No. 5,181,943, liquid removal is effectuated by providing a large number of plate-type baffles across the path of a liquid-gas stream, the baffles being substantially parallel but downward sloping, and alternately extending from opposite sides of the separation device, positioned transverse to the initial direction of flow. This device creates a high surface area serpentine path, and must be quite large if pressure drop is to be low. Since in many cases the separator must be maintained at a specific operating temperature and thus requires considerable external insulation, such devices are relatively capital intensive.

U.S. Pat. No. 5,510,017 discloses a gas-liquid separator involving two sets of concentric, radially arranged vanes, which cause a swirling flow of liquid-containing gas directed there through. The centrifugal forces generated cause liquid droplets to impinge upon the walls of the pipe section containing the separator, from which they are removed as bulk liquid by a series of drains. This device is of rather complex construction, and is believed to be useable only when configured for horizontal flow due to the placement of liquid-trapping baffles and drains. Moreover, conversion of linear flow to a swirling flow necessarily requires energy, which is manifested as a pressure drop.

EP 0 197,060 discloses a gas liquid separator useful in gas desulfurizing, which employs a plurality of groups of obliquely mounted large surface area slats which are sprayed with a rinsing liquid to carry away droplets impinging upon the slats. Use of a rinsing liquid is undesirable in many applications.

U.S. patent application No. 20050056150 discloses a gas-liquid separator that is referred to as a fishbone separator because the construction of it involves a central spine from which emanates a plurality of vanes for collecting liquid droplets. The fishbone construction described in the '150 application is limited in that it is placed in the upstream (inlet) region of an elbow where the centerline of the elbow inlet is substantially vertical. This limitation is significant in that the conduit system carrying the gas exiting polymerization reactors tend to be large and inflexible offering only a limited number of available conduit positions for placing the gas-liquid separator. In some conduit layouts the upstream (inlet) region of an elbow may not be accessible, or an elbow as such may not be present in the conduit system.

Accordingly, there is a need for an improved gas-liquid separator with a simple design and construction that can be positioned at addition positions in a polymerization reactor conduit system, which can be used without rinse liquid, which offers low pressure drop, and which is efficient at separating droplets with relatively small inertia from a gas stream.

SUMMARY OF THE INVENTION

The present invention solves one or more problems of the prior art by providing in one embodiment, a gas liquid separation enhancer that can be placed within a conduit attached to a polymerization reactor. The gas-liquid separation enhancer of the invention advantageously separates liquid, and in particular liquid droplets from a gas stream. In one embodiment, the separation enhancer includes a central return channel and a plurality of longitudinally extending vanes. The longitudinally extending vanes are positioned to direct a portion of any liquid contacting the vanes into the central return channel. The central return channel directs liquid in a downward direction under the force of gravity in an opposite sense to the direction of the stream of gas and liquid droplets.

In another embodiment of the invention, a gas-liquid separation enhancer with a peripheral return channel and without a central return channel is provided. The gas-liquid separation enhancer of this embodiment includes a central spine (instead of a central channel), a plurality of longitudinally extending vanes distributed along the central spine, and a peripheral return channel. Each vane has a first end and a second end wherein the first end of each vane is adjacent to the central spine with each vane positioned to direct a portion of any liquid contacting the vanes to the second end away from the central spine toward the conduit wall and the peripheral return channel. The peripheral return channel directs material from the conduit wall above the return channel in a downward direction under the force of gravity in an opposite sense to the direction of the gas stream containing liquid droplets.

In another embodiment of the invention, a gas-liquid separation enhancer with both a central return channel and a peripheral channel is provided. The gas-liquid separation enhancer of this embodiment includes a plurality of longitudinally extending vanes distributed along the central return channel. Each vane has a first end and a second end wherein the first end of each vane is adjacent to the central return channel with each vane positioned to direct a portion of any liquid contacting the vanes to the second end toward the central return channel. Finally, the central return channel directs liquid from the vanes in a downward direction under the force of gravity in an opposite sense to the direction of the stream of gas and liquid droplets. The peripheral return channel directs material from the conduit wall above the return channel in a downward direction under the force of gravity in an opposite sense to the direction of the stream of gas containing liquid droplets.

In yet another embodiment of the invention, a gas-liquid separation enhancer without return channels (central or peripheral) and positionable in a section of a conduit extending from a process vessel is provided. The gas-liquid separation enhancer of this embodiment includes a central spine and a plurality of longitudinally extending vanes distributed along the spine. Again, each vane has a first end and a second end wherein the first end of each vane is adjacent to the central spine. This embodiment is distinguished from the other separation enhancers in that this embodiment is applicable to conduits which are sloped such that liquid on the spine and conduit wall around it flows back to the reactor from which it originates under the influence of gravity so return channels as such may not be needed.

BRIEF DESCRIPTION OF THE DRAWINGS

FIG. 2D is a magnified view of the separation enhancer and conduit side nozzle of FIG. 1B;

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

Figure 1A:
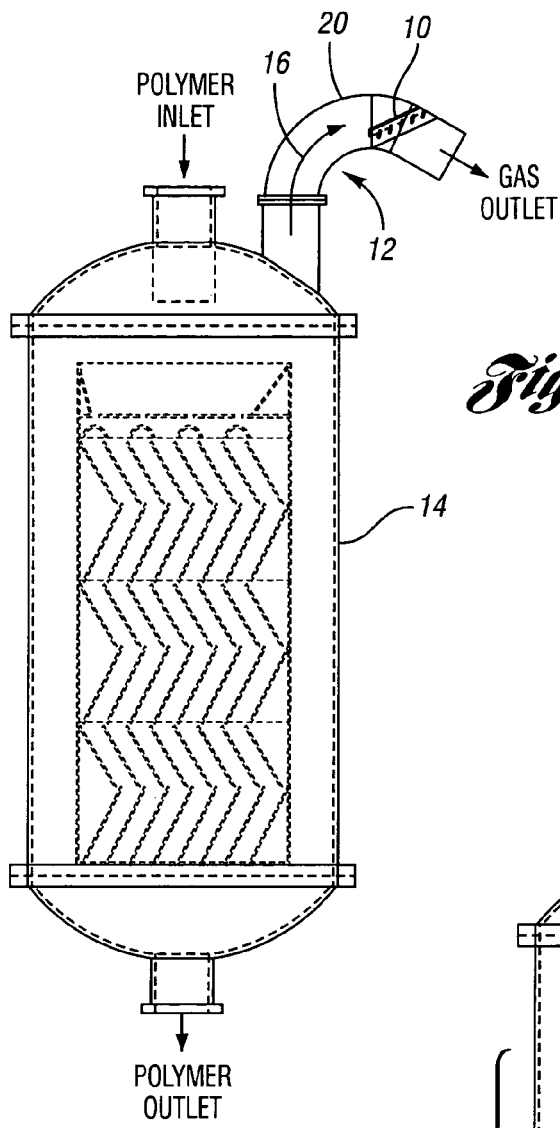
FIG. 1A is a side-view of a separation enhancer placed within the exit region of an elbow that is part of a conduit system extending from a reactor.
Figure 2A:
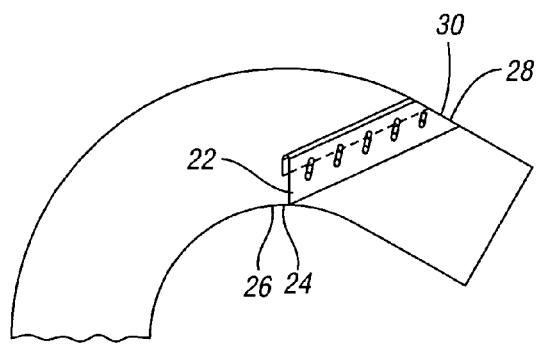
FIG. 2A is a magnified view of the separation enhancer and elbow of FIG. 1A.

With reference to FIGS. 1A and 2A, a first embodiment of the gas-liquid separation enhancer (i.e., the gas-liquid separator) of the invention is provided. FIG. 1A provides a side-view of the separation enhancer placed within the exit region of an elbow of a reactor conduit. FIG. 2A is a magnified view of the side-view of FIG. 1A. Gas-liquid separation enhancer 10 is positionable in conduit 12 for separating liquid from a stream having gas and liquid droplets emanating from process vessel 14. Typically, conduit 12 has a circular cross-section although other shapes are possible. The stream flows through conduit 12 in flow direction 16 which leads away from process vessel 14. In some variations of this embodiment, process vessel 14 is a polymerization reactor such as a polycondensation polymerization reactor. Accordingly, the liquid droplets typically include at least one of liquid monomers or oligomers.

Still referring to FIGS. 1A and 2A, separation enhancer 10 may be placed in conduit 12 in the exit region of conduit elbow 20. In a variation of this embodiment, bottom end 22 of separation enhancer 10 is attached at position 24 of conduit 12 which is at or adjacent to apex position 26 of conduit elbow 20 while top end 28 of separation enhancer 10 is attached to at position 30 of conduit 12. An inlet end of elbow 20 is in fluid communication with process vessel 14 which emanates a stream of gas containing liquid droplets—into elbow 20 with collected liquid from separation enhancer 10 being directed back into vessel 14. In this variation, most of separation enhancer 10 will be outside of a line of site for most positions within process vessel 14 such that at least a portion of separation enhancer 10 extends in a direction past apex position 26 of elbow 20 in a direction downstream of elbow 20 when conduit 12 is part of process vessel 14.

Figure 2B:
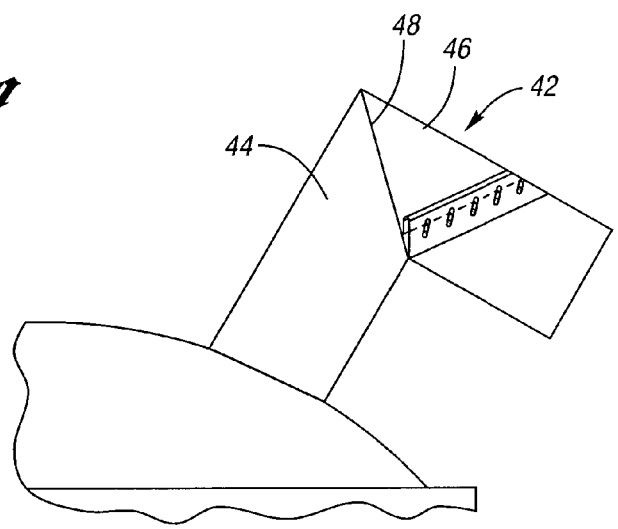
FIG. 2B is a magnified view of the separation enhancer in the second piece of a two-piece 90° bend.
Figure 2C:
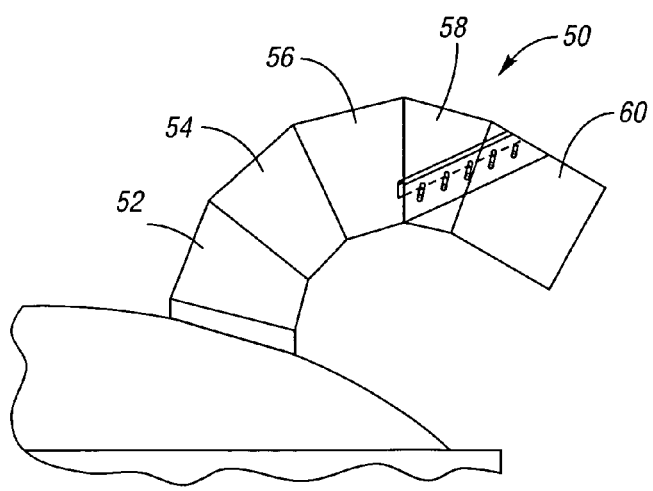
FIG. 2C is a magnified view of the separation enhancer following a four-piece 90° bend.
Figure 2B:
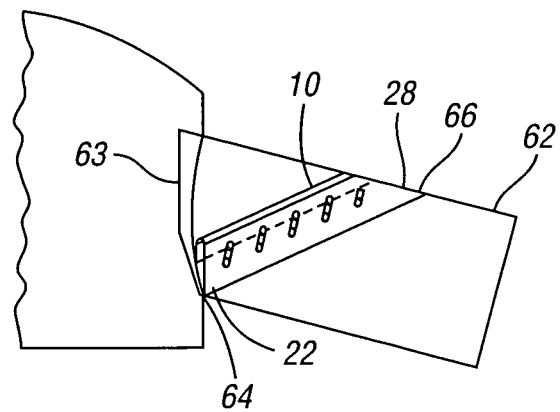

With reference to FIGS. 2B and 2C, the utilization of the separation enhancer of the invention as used with mitered bends is provided. As used herein, "mitered bend" means that the bend is formed by joining the ends of straight sections of conduit together. FIG. 2B illustrates a simple two-piece 90° bend with a separation enhancer. In FIG. 2B mitered bend 42 includes bend sections 44, 46 which are connected along beveled seam 48. In FIG. 2C a mitered bend is shown that is an alternative to the elbow of FIG. 2A. Mitered bend 50 is formed from bend sections 52, 54, 56, 58, 60.

Figure 1B:
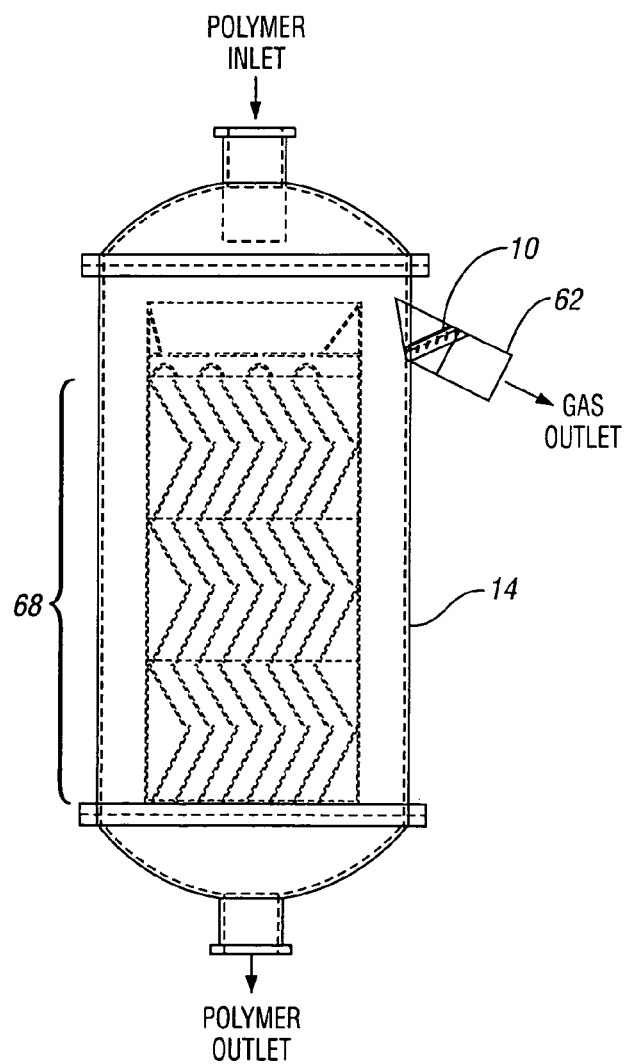
FIG. 1B is a side-view of a separation enhancer placed within a conduit that is a side nozzle, extending out from a reactor.

With reference to FIGS. 1B and 2D, a variation of the separation enhancer as used in a conduit that is a side nozzle extending from the reactor is provided. FIG. 1B provides a side-view of separation enhancer 10 placed within side nozzle 62 that extends from process vessel 14. FIG. 2D is a magnified view of the separation enhancer and side nozzle of FIG. 1B. In some variations, section 63 of side nozzle 62 extends into process vessel 14 in order to prevent droplets that have contacted the top of process vessel 14 from entering side nozzle 62. In this variation, the stream containing gas and liquid emanates from process vessel 14 through a side nozzle 62. An inlet end of side nozzle 62 is in fluid communication with process vessel 14 which emanates a stream of gas containing liquid droplets into side nozzle 62 with collected liquid being directed back into vessel 14 from separation enhancer 10. Bottom end 22 of separation enhancer 10 is attached at position 64 of side nozzle 62 while top end 28 of separation enhancer 10 is attached to at position 66 of conduit (side nozzle) side nozzle 62. In general, separation enhancer 10 will be outside the line of site for positions below height 68.

Figure 3:
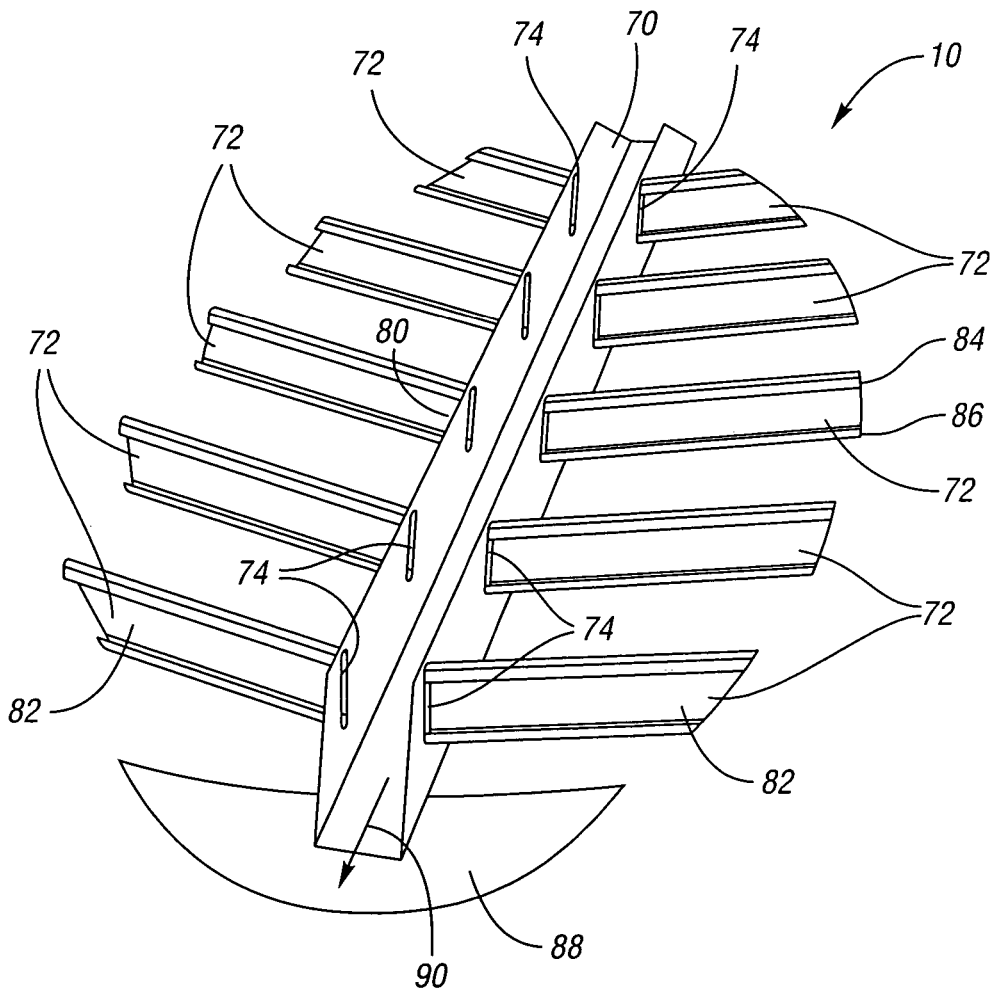
FIG. 3 is a perspective view of an embodiment of the separation enhancer of the invention.

With reference to FIG. 3, an illustration of one embodiment of the separation enhancer 10 is provided. Separation enhancer 10 includes central return channel 70 and a plurality of longitudinally extending vanes 72 distributed in a fishbone pattern along central return channel 70. The vanes and central return channel 70 are constructed from any material that is compatible with the temperature and chemical conditions to which separation enhancer 10 is exposed. In particular, a metal construction is useful. The central return channel has a width of about one half or less of the internal diameter of the conduit. In general, vanes 70 have a somewhat hollow construction. Specifically, the vanes have an opening along a length thereof with the opening facing the direction of gas flow. As set forth below, the opening is located such that the hollow vane has a fluid collecting lip located at the bottom thereof. Vanes are positioned to provide a surface to contact the stream having gas and liquid droplets when separation enhancer 10 is placed within process vessel 14. Specifically, each of vanes 72 are positioned to provide substantially maximal contact with the stream having gas and liquid droplets during operation. Therefore, vanes 72 are mounted such that an axis through the height of the cross-section is angled from the direction of gas flow from 20° to about 90°. Additional vane designs and methods of attaching vanes are provided in Patent Application No. 20050056150, which is hereby incorporated by reference. In a variation of the inventions, central return channel 70 includes a plurality of inlet openings 74. Each vane of the plurality of longitudinally extending vanes 72 includes first end 80 and second end 82. Moreover in the embodiment shown, vanes 72 include top lip 84 and bottom lip 86. Bottom lip 86 provides a channel for transporting liquid to central return channel 70. Vanes 72 are attached to central return channel 70 by any technique that results in a structure that can withstand the temperature and chemical environment likely present during operation of the process vessel. Regardless of the mechanism with which vanes 72 are attached, the plurality of longitudinally extending vanes 72 are distributed along central return channel 70 and positioned to direct a portion of any liquid contacting the vanes to first end 80 and through one of the inlet openings 74 and into the central return channel 70. It should also be appreciated that when separation enhancer 10 is placed within a conduit, vanes 72 will be angled relative to a horizontal plane such that liquid collecting in the vanes will flow under the force of gravity into central return channel 70. Moreover, separation enhancer 10 is positionable in a conduit as set forth above such that central return channel 70 is also at an angle with respect to a horizontal plane. Although any angle is possible so long as central return channel 70 slopes towards process vessel 14 when separation enhancer 12 is positioned in a conduit, typical values for this angle are from about 20° to 80°. When separation enhancer 10 is placed within conduit 12 (or side nozzle 32) of a functioning process vessel 14, liquid droplets emanating with the gas stream from process vessel 14 impinges on central return channel 70 and vanes 72. At least a portion of the liquid contained in the stream is captured by central return channel 70 and vanes 72. That portion of the liquid captured by vanes 72 flows toward and then into central channel 70. Liquid collected by central return channel 70 flows in downward direction 90 under the force of gravity towards process vessel 14. Clearly, direction 90 is in an opposite sense to the flow direction of the stream having gas and liquid droplets. Accordingly, at least a portion of the collected liquid falls back into process vessel 14. Optionally, separation enhancer 10 also includes bottom guard 88 which further directs the liquid away from separation enhancer 10, and to inhibit liquid from bypassing the separation enhancer by flowing away from process vessel 14.

Figure 4A:
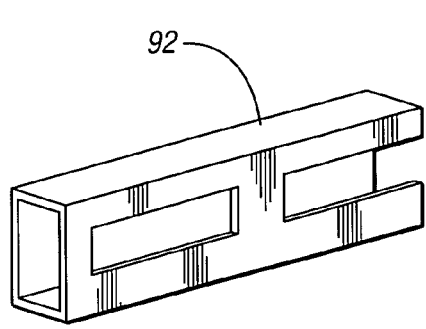
FIG. 4A is a perspective view of a vane with a rectangular shape.
Figure 4B:
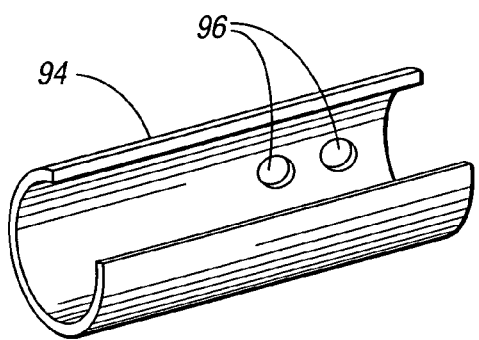
FIG. 4B is a perspective view of a vane with an open "semi-circular" shape.
Figure 4C:
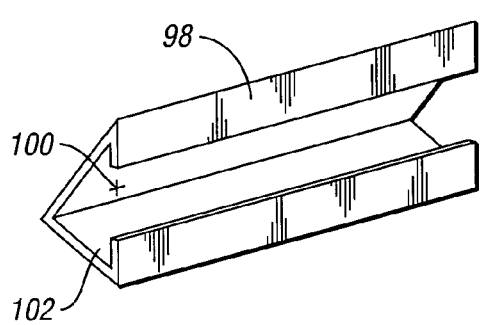
FIG. 4C is a perspective view of a vane with a triangular shape.
Figure 4D:
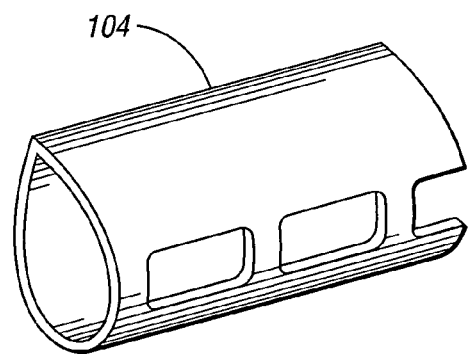
FIG. 4D is a perspective view of an airfoil vane.
Figure 4E:
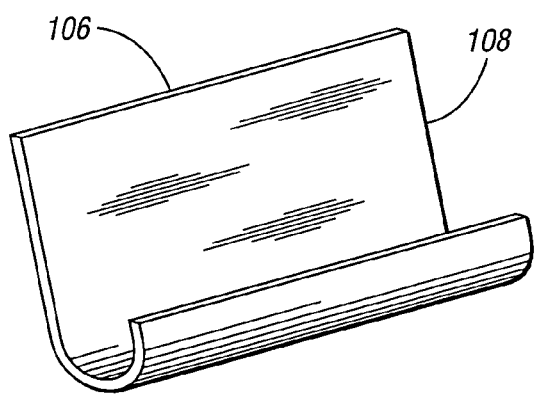
FIG. 4E is a perspective view of a vane having only a bottom lip.

With reference to FIGS. 4A-E, alternative constructions for the vanes used in the separation enhancer of the invention are provided. The vanes preferably are constructed "hollow," with a longitudinal slit, e.g. having a "C" or "J" cross-section, and are of a cross-section such that when in position in the fishbone, a bottom channel is preferably present, to aid in conducting liquid along the vane, and to shield collected liquid from the gas flow, so that liquid does not reenter the gas stream. Circular, elliptical, airfoil, square, rectangular, or other shapes may be used. The shape and oblique angle with respect to gas flow may be calculated by aerodynamic simulations to minimize pressure drop, and/or to maximize fluid collection efficiency. In FIG. 4A, a rectangular vane 92 is shown, with discontinuous openings. In FIG. 4B, an open "semi-circular" vane 94 is depicted, with two holes 96 for attaching the vane by bolts to a mounting strut. FIG. 4C illustrates a triangular vane 98 with a completely open portion 100 along its length, and a liquid collecting lip 102. FIG. 4D shows an airfoil vane 104 with a discontinuous opening, while FIG. 4E shows a vane 108 having no top lip at its upper end 106.

Figure 5A:
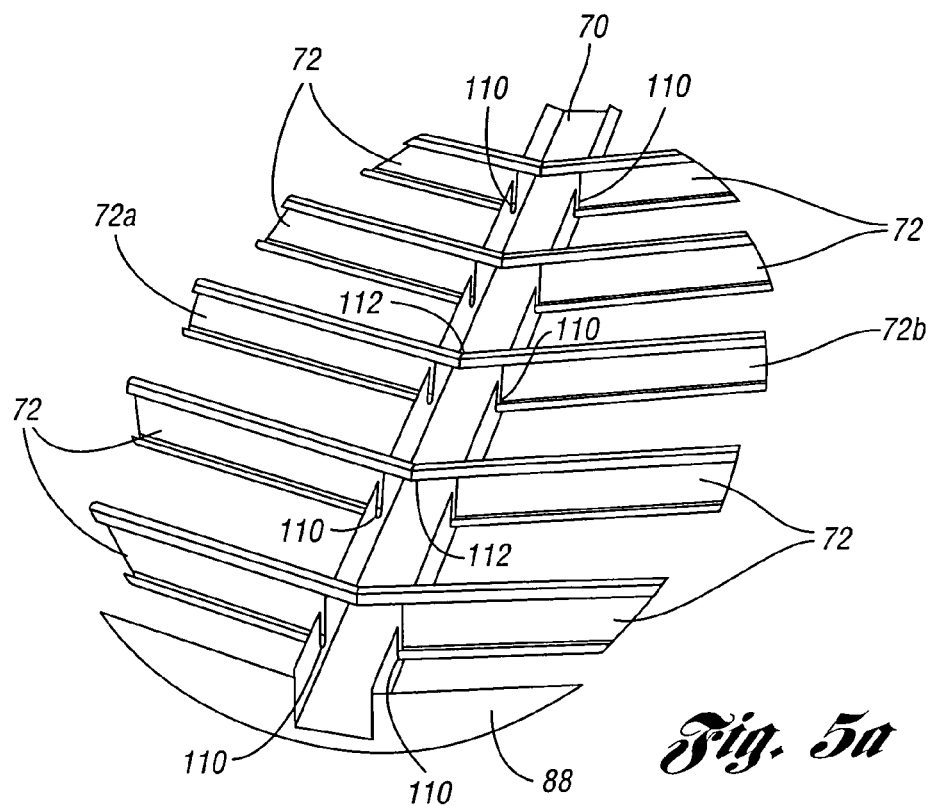
FIG. 5A is a perspective view in which the vanes line up with notches in the central return channel.
Figure 5B:
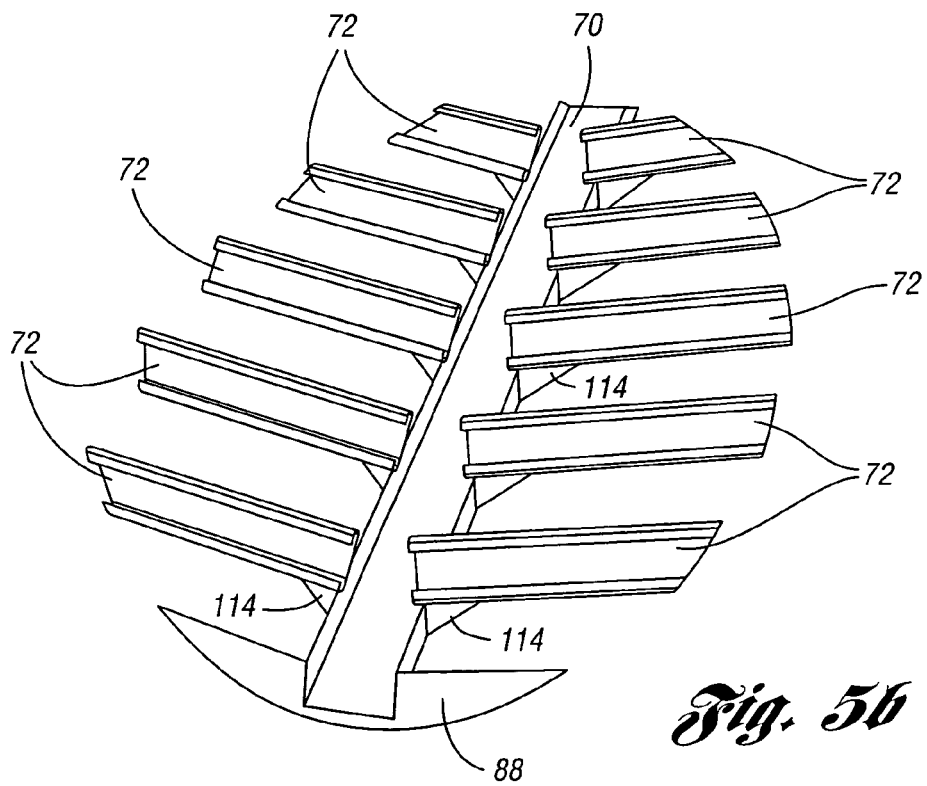
FIG. 5B is a perspective view in which the vanes overhang the central return channel.

With references to FIGS. 5A and 5B, examples of alternative mechanisms for positioning vanes 72 about central return channel are provided. FIG. 5A provides a perspective view in which the vanes line up which notches in the central return channel. Specifically, return channel 70 includes a plurality of notches 110 instead of openings. Vanes 72 are aligned with notches 110. Moreover, opposing vanes 72a, 72b are optionally attached together at position 112 for added structural strength. FIG. 5B provides a perspective view of another variation in the method of attaching the vanes. In this variation, vanes 72 overhang central return channel 70 and are mounted on brackets 114.

Figure 6A:
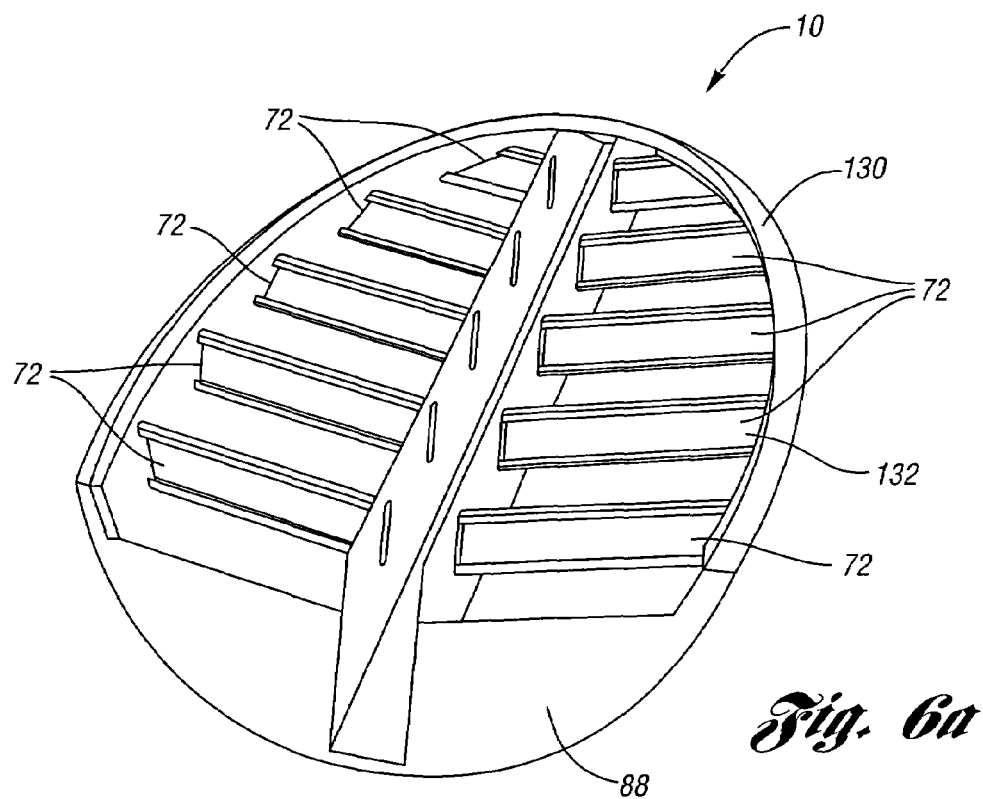
FIG. 6A is a perspective view of the incorporation of a peripheral return channel positioned in front of vanes.
Figure 6B:
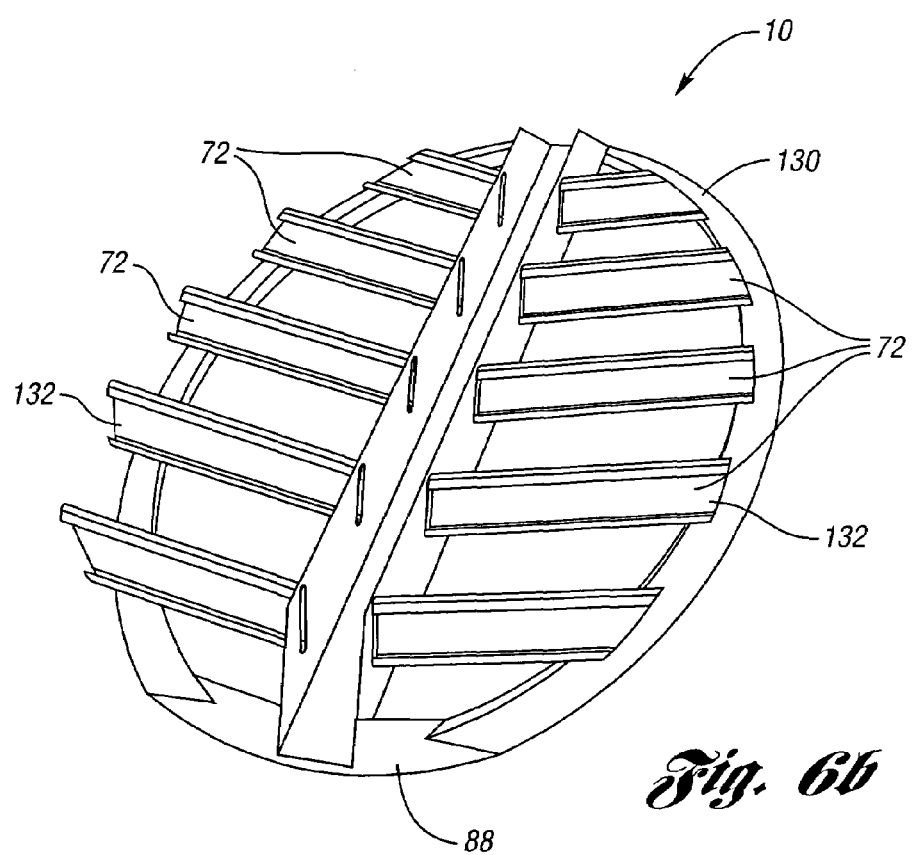
FIG. 6b is a perspective view of the incorporation of a peripheral return channel positioned behind the vanes.

In another embodiment of the invention, the separation enhancer set forth above includes a peripheral return channel. With reference to FIGS. 6A and 6B variations of the utilization of a peripheral return channel are illustrated. FIG. 6A is a perspective view of the incorporation of a peripheral return channel positioned in front of the vanes. Peripheral channel 130 is positioned in front of ends 132 of vanes 72. Moreover, peripheral return channel 130 when placed within a conduit will be adjacent to the interior surface of such a conduit such that liquid does not escape past the periphery of separation enhancer 10. Liquid collected by peripheral return channel 130 flows downward under the force of gravity in a direction that is in an opposite sense to the direction of the stream of gas and liquid droplets. If present, the liquid will then flow over bottom guard 88. FIG. 6B is a perspective view of the incorporation of a peripheral return channel positioned behind the vanes. The peripheral return channel 130 of this variation functions similarly to the peripheral return channel 130 of FIG. 6A.

Figure 7:
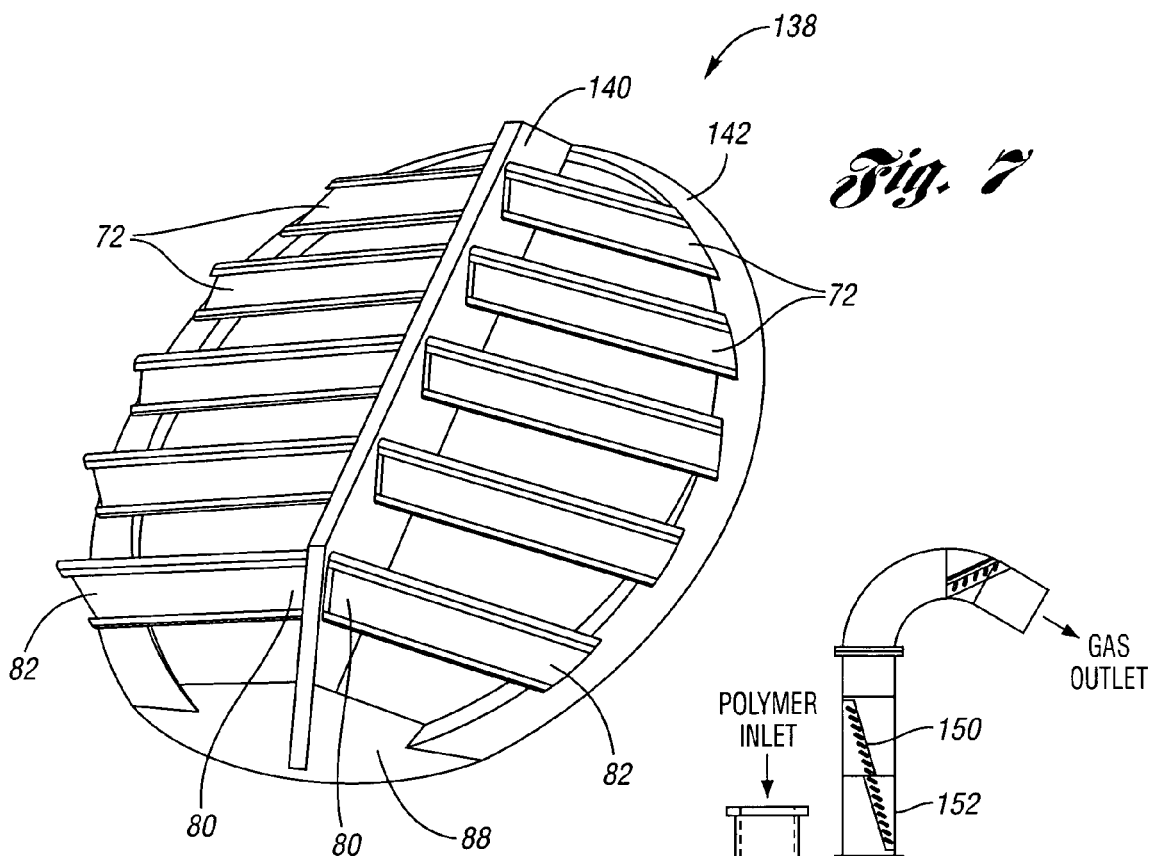
FIG. 7 provides a perspective view of a separation enhancer of this embodiment with a central spine and a peripheral return channel behind the vanes.

In another embodiment of the invention, a gas-liquid separation enhancer is provided with a peripheral return channel and a central spine in place of a central return. FIG. 7 provides a perspective view of the separation enhancer of this embodiment. Separation enhancer 138 includes a plurality of longitudinally extending vanes 72 distributed along central spine 140. Each vane of vanes 72 has first end 80 and a second end 82 such that each vane is attached to central spine 140 at first end 80 and is positioned to direct a portion of any liquid contacting the vane to second end 82. Peripheral return channel 142 is located behind the periphery of vanes 72. The specific details regarding the construction of vanes 72 are set forth above. Moreover, separation enhancer 138 may optionally include a central return channel (not shown) positioned behind (i.e., downstream of) central spine 140 to receive droplets flowing from vanes 72 when the vanes are sloped such that captured droplets flow towards central spine 140.

Figure 8:
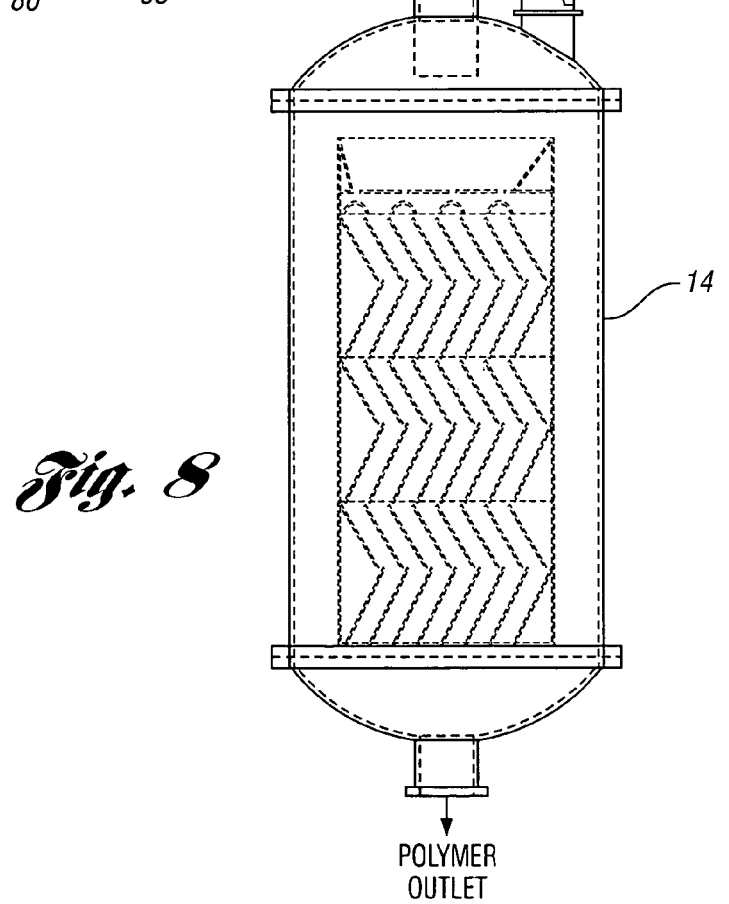
FIG. 8 is a side-view of a separation enhancer placed within a straight and substantially vertical section of a conduit system extending from a reactor.
Figure 9:
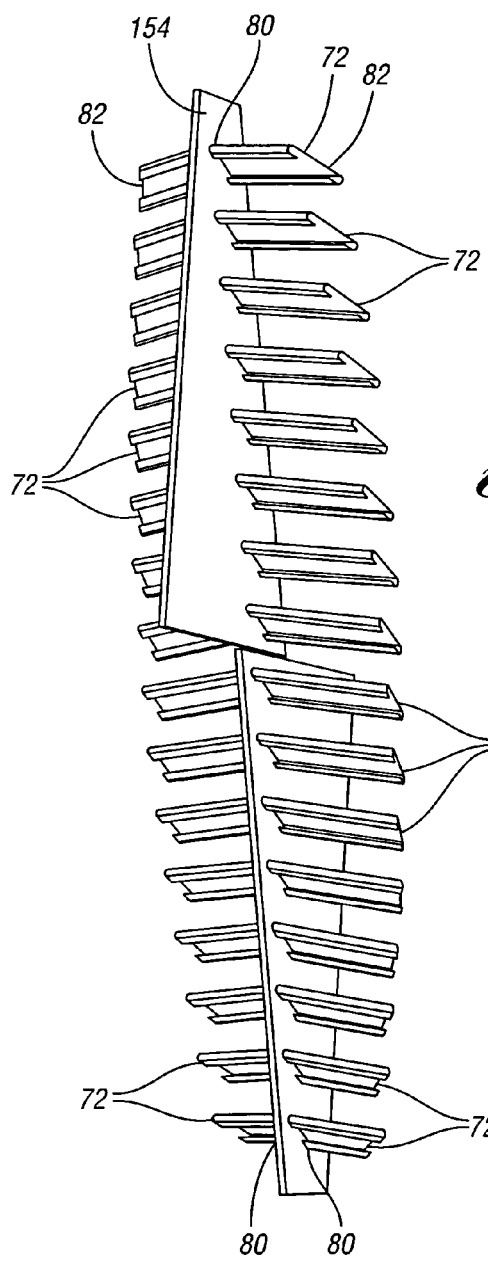
FIG. 9 is a perspective view of the separation enhancer of FIG. 8.

In another embodiment of the invention, a gas-liquid separation enhancer without return channels (central and peripheral) and positionable in a section of a conduit extending from a process vessel is provided. The location and slope of the section of conduit containing the separation device determines if this is the case. With reference to FIGS. 8 and 9, a separation enhancer positionable within a straight and substantially vertical section of a conduit is illustrated. FIG. 9 is a perspective view of the separation enhancer of FIG. 8. In this embodiment, separation enhancer 150 is placed within conduit section 152 that is in fluid communication with process vessel 14. Separation enhancer 150 includes central spine 154 and a plurality of longitudinally extending vanes 72 distributed along central spine 154. Again, each of vanes 72 has first end 80 and second end 82 such that first end 80 of each vane is adjacent to the central spine 154 and each vane is positioned to direct a portion of any liquid contacting vanes 72 to second end 82 away from the central spine 154. The specific details regarding the construction of vanes 72 are set forth above. Moreover, separation enhancer 150 may optionally include a central return channel (not shown) positioned to receive droplets flowing from vanes 72 when the vanes are sloped such that captured droplets flow towards central spine 154.

Figure 10:
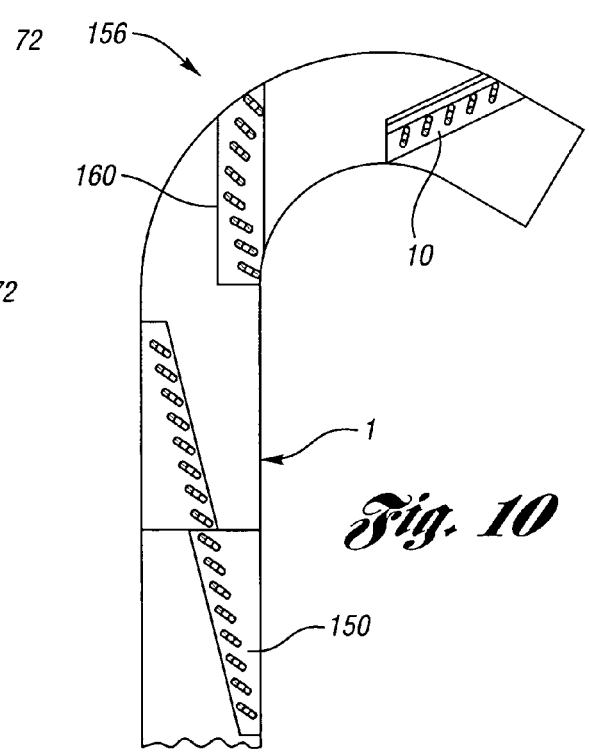
FIG. 10 is a side-view illustrating the possible use of multiple separation enhancers in a conduit system extending from a reactor.

In still another embodiment of the invention, a plurality of separation enhancers is included in an exhaust gas conduit. With reference to FIG. 10, inclusion of multiple separation enhancers is illustrated. Utilization of multiple separation enhancers always improves the efficiency of liquid droplet removal from a gas stream compared to a single separation enhancer. Conduit 156 includes separation enhancer 150 and separation enhancer 10 each of which is described in detail above. Also included in conduit 156 is separation enhancer 160 which is of the designs described in U.S. patent application No. 20050056150 which is already incorporated by reference.

In yet another embodiment of the invention, the separation enhancers set forth above are used in a process for the separation of droplets of liquid from a flowing gas stream. An example of such a process is best appreciated with reference to FIGS. 1A, 1B, 2A, 2B, 2C and 2D. A stream that includes gas and entrained liquid droplets emerges from process vessel 14 along direction 16. Conduit 12 directs the stream into separation enhancer 10 which is of a fishbone construction as set forth above being constructed with vanes emanating from a central return channel or spine. Liquid is subsequently collected by contact of the droplets with separation enhancer 10 and the walls of elbow 20 or mitered bend 50 and 42. An exist gas stream depleted of liquid droplets emerges from elbow 20. When the conduit containing the separation device is a side nozzle, liquid is collected by contact of the droplets with separation enhancer 10 and the walls of side nozzle 62. The details for separation enhancer 10 are set forth above.

Similarly, with reference to FIGS. 8 and 9, a stream that includes gas and entrained liquid droplets emerges from process vessel 14 flowing into conduit 152. Conduit 152 directs the stream into separation enhancer 150 which is of a fishbone construction as set forth above being constructed with vanes emanating from a central spine or a central spine with return channel. Liquid is subsequently collected by contact of the droplets with separation enhancer 150.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A gas-liquid separation enhancer positionable in a conduit for separating liquid from a stream having gas and liquid droplets, the separation enhancer comprising:
   a central return channel; and
   a plurality of longitudinally extending vanes distributed along the central return channel, each vane having a first end and a second end wherein each vane is positioned to direct a portion of any liquid contacting the vanes to the first end and into the central return channel.

2. The separation enhancer of claim 1 wherein the separation enhancer is positionable in a conduit such that the central return channel is at an angle with respect to a horizontal plane.

3. The separation enhancer of claim 2 wherein the separation enhancer is positionable in a conduit section composed of an elbow or mitered bend such that at least a portion of the separation enhancer extends in a direction past an apex of the elbow or mitered bend in a direction downstream of the elbow or mitered bend when the conduit is part of a polymerization reactor.

4. The separation enhancer of claim 2 wherein liquid entering the central return channel is directed in a downward direction under the force of gravity, the direction being in an opposite sense to the flow direction of the stream having gas and liquid droplets.

5. The separation enhancer of claim 1 further comprising a bottom guard to further direct the liquid away from the separation enhancer and to inhibit liquid from by-passing the separation enhancer.

6. The separation enhancer of claim 2 wherein each vane is positioned to provide a surface to contact the stream having gas and liquid droplets.

7. The separation enhancer of claim 6 wherein each vane is positioned to provide substantially maximal contact with the stream having gas and liquid droplets.

8. The separation enhancer of claim 6 further comprising a peripheral return channel, the peripheral return channel directing liquid in a downward direction that is in an opposite sense to the direction of the stream of gas and liquid droplets.

9. The separation enhancer of claim 8 wherein the peripheral return channel is positioned in front of the second end of each vane of the plurality of vanes and adjacent to an inner wall of the conduit.

10. The separation enhancer of claim 8 wherein the peripheral return channel is positioned behind the second end of each vane of the plurality of vanes and adjacent to an inner wall of the conduit.

11. The separation enhancer of claim 1 wherein the vanes are of hollow construction and have at least one opening along a length thereof.

12. The separation enhancer of claim 11 wherein the opening is along the entire length of the vane, the vane being positioned such that the opening faces the direction of gas flowing through the conduit.

13. The separation enhancer of claim 1 wherein the vanes are mounted such that an axis through the height of the cross-section is angled from the direction of gas flow from 20° to about 90°.

14. The separation enhancer of claim 13 wherein the vanes are hollow and have an opening along a length thereof, the opening facing the direction of gas flow, the opening located such that the hollow vane has a fluid collecting lip located at the bottom thereof.

15. The separation enhancer of claim 1 wherein the central return channel is a metal return channel having a width of about one half or less of the internal diameter of the conduit.

16. The separation enhancer of claim 1 wherein the conduit has a circular cross-section or a polygonal cross-section.

17. The separation enhancer of claim 1 wherein the conduit is a side nozzle in a process vessel.

18. The separation enhancer of claim 1 wherein the plurality of longitudinally extending vanes comprises one or more vanes selected from the group consisting of vanes with a triangular shape, vanes with a rectangular shape, vanes with an open "semi-circular" shape, airfoil vanes, vanes having a bottom lip, and combinations thereof.

19. A process for the separation of droplets of liquid from a flowing gas stream, comprising directing the gas stream into the separation enhancer of claim 1.

20. A gas-liquid separation enhancer positionable in a conduit for separating liquid from a stream having gas and liquid droplets, the separation enhancer comprising:

a central spine;

a plurality of longitudinally extending vanes distributed along the central spine, each vane having a first end and a second end wherein the first end of each vane is adjacent to the central spine and each vane is positioned to direct a portion of any liquid contacting the vanes to the second end away from the central spine; and peripheral return channel, the peripheral return channel directing liquid in a downward direction that is in an opposite sense to the direction of the stream of gas and liquid droplets.

21. The separation enhancer of claim 20 wherein the vanes are of hollow construction and have at least one opening along a length thereof.

22. The separation enhancer of claim 21 wherein the opening is along the entire length of the vane, the vane being positioned such that the opening faces the direction of gas flowing through the conduit.

23. The separation enhancer of claim 22 wherein the vanes have a fluid collecting lip located at the bottom thereof.

24. The separation enhancer of claim 20 wherein the conduit is an elbow, mitered bend, or a side nozzle.

25. A process for the separation of droplets of liquid from a flowing gas stream, comprising directing the gas stream into the separation enhancer of claim 20.

26. A gas-liquid separation enhancer without return channels (central and peripheral) positionable in a section of a conduit for separating liquid from a stream having gas and liquid droplets, the separation enhancer comprising:

a central spine; and a plurality of longitudinally extending vanes distributed along the central spine, each vane having a first end and a second end wherein the first end of each vane is adjacent to the central spine and each vane is positioned to direct a portion of any liquid contacting the vanes to the second end away from the central spine.

27. The separation enhancer of claim 26 wherein each vane is positioned to provide a surface to contact the stream having gas and liquid droplets.

28. The separation enhancer of claim 27 wherein each vane is positioned to provide substantially maximal contact with the stream having gas and liquid droplets.

29. The separation enhancer of claim 26 wherein the vanes are of hollow construction and have at least one opening along a length thereof.

30. The separation enhancer of claim 29 wherein the opening is along the entire length of the vane, the vane being positioned such that the opening faces the direction of gas flowing through the conduit.

31. The separation enhancer of claim 26 wherein the vanes have a fluid collecting lip located at the bottom thereof.

32. A process for the separation of droplets of liquid from a flowing gas stream, comprising directing the gas stream into the separation enhancer of claim 26.

* * * * *